United States Patent [19]

Tsang

[11] 4,225,395

[45] Sep. 30, 1980

[54] REMOVAL OF OXIDES FROM ALKALI METAL MELTS BY REDUCTIVE TITRATION TO ELECTRICAL RESISTANCE-CHANGE END POINTS

[75] Inventor: Floris Y. Tsang, Walnut Creek, Calif.

[73] Assignee: The Dow Chemical Company, Midland, Mich.

[21] Appl. No.: 955,052

[22] Filed: Oct. 26, 1978

[51] Int. Cl.$^2$ ............................................. G01N 27/26
[52] U.S. Cl. .................................... 204/1 T; 23/230 R
[58] Field of Search ................... 204/1 T, 1 Y, 195 R, 204/195 T, 1 A, 1 M; 23/230 R

[56] References Cited

U.S. PATENT DOCUMENTS

| | | | |
|---|---|---|---|
| 2,928,774 | 3/1960 | Leisey | 204/195 T |
| 3,309,233 | 3/1967 | McPheeters et al. | 204/195 S |
| 3,679,551 | 7/1972 | Kolodney | 204/1 T |
| 3,714,014 | 1/1973 | Romberger et al. | 204/195 R |
| 3,718,546 | 2/1973 | Salzano et al. | 204/195 R |

Primary Examiner—G. L. Kaplan
Attorney, Agent, or Firm—R. R. Stringham

[57] ABSTRACT

Alkali metal oxides dissolved in alkali metal melts are reduced with soluble metals which are converted to insoluble oxides. The end points of the reduction is detected as an increase in electrical resistance across an alkali metal ion-conductive membrane interposed between the oxide-containing melt and a material capable of accepting the alkali metal ions from the membrane when a difference in electrical potential, of the appropriate polarity, is established across it. The resistance increase results from blocking of the membrane face by ions of the excess reductant metal, to which the membrane is essentially non-conductive.

11 Claims, 1 Drawing Figure

REMOVAL OF OXIDES FROM ALKALI METAL MELTS BY REDUCTIVE TITRATION TO ELECTRICAL RESISTANCE-CHANGE END POINTS

The present invention was made under a United States Government Research Contract, ARPA No. DAHC-15-73-C-0254.

BACKGROUND OF THE INVENTION

It has been known for some time that the presence of alkali metal oxides in liquid alkali metals is undesirable, or even intolerable, when the liquid metal is to be used as an electrical conductor or as a heat transfer medium—particularly in atomic reactor systems. Further, it has now been discovered that if sodium containing any substantial amount of sodium oxide(s) is used in a hollow-fiber type sodium/sulfur battery cell, the useful life of the cell will be curtailed by corrosion (by the sodium oxide) at the inner surfaces of the fibers—which serve as the electrolyte/separator membrane in the cell.

Similar corrosion would be expected to occur in alkali metal/chalcogen battery cells in general when the alkali metal used is contaminated with alkali metal oxides. However, the geometry and restricted cross section of hollow fibers, which are typically hair-like, are such that the problem of corrosion is particularly acute in Na/S cells utilizing such fibers. (Cells of the latter type operate at temperatures of about 300°–400° C. and are described in U.S. Pat. Nos. 3,476,062; 3,672,995; 3,791,868 and others.) Experience with such cells strongly suggests that fiber failures which occur when the cell is put back on charge after prolonged, "deep" discharge are caused by the structural changes resulting from corrosion and accompanied by the (relatively abrupt) development of a high resistance in the latter stages of the discharge period.

The solubility of sodium oxide in sodium varies from several parts per million, at the melting point of sodium, up to several hundred parts per million at elevated temperatures (300°–400° C., for example). For most applications, an oxide content of more than a couple of parts per million is considered "substantial" and must be reduced in some manner.

In a well known "gettering" procedure, the sodium oxide is reduced with an active metal, such as zirconium, which is insoluble in sodium. The sodium is repeatedly passed over a gauze or foil of the zirconium-type metal at elevated temperatures (600°–800° C., for example). This method is effective but requires long residence times and is relatively inefficient for treatment of small batches of sodium.

An ancillary problem is to be able to monitor the oxygen/oxide content in alkali metals which are employed under conditions where oxygen uptake may occur. For example, when liquid sodium is circulated as a coolant in atomic reactor loops, it is essential to monitor oxygen content, even though the sodium is charged in an oxygen-free condition to a purged system which is subsequently sealed. U.S. Pat. No. 3,309,233 discloses the use of a solid electrolyte, electrochemical cell, in which the electrolyte is composed of yttria, ($Y_2O_3$), for monitoring the dissolved oxygen content of sodium at temperatures within the range of 400°–500° C. This is done by measuring the e.m.f. developed between half-cells on opposite sides of the yttria membrane. One half-cell contains Na/$Na_2O$ saturated with oxygen and the other half-cell contains the sodium being monitored, which is continuously circulated through the cell as a bleed stream from the main sodium body. The oxygen content of the monitored sodium is calculated from the developed e.m.f. by appropriate relationships. According to the patent, this method is generally not suitable for use at temperatures outside of the 400°–500° C. range.

At the present stage of development of alkali metal/chalcogen batteries, the alkali metals (sodium, principally) are required in much smaller amounts than are appropriate for really efficient (continuous) gettering treatments. A need for a faster, more convenient and efficient method of removing oxygen (oxides) from relatively small bodies of alkali metals is apparent.

It is well known that alkali metal oxides can be reduced, with reactive metals, such as the alkaline earth metals and certain rare earth metals, which are soluble in the alkali metals. It is also known that the oxides of the latter metals produced by the reaction are essentially insoluble in molten alkali metals. However, it does not appear that removal of dissolved alkali-metal oxides from molten alkali metals by means of this reaction has seriously been considered. This may be at least partly due to the fact that the amount of the reducible oxide present in a given body of the alkali metal must first be determined if introduction of more than a stoichiometric amount of the reductant (and soluble) metal is to be ensured. (This is not a problem in the preceding "gettering" procedure.)

OBJECTS OF THE INVENTION

The primary object of the present invention is to eliminate a cause of corrosion in (and failure of) alkali metal/chalcogen battery cells.

A corollary, principal object is to increase the useful lifetimes of alkali metal/chalcogen battery cells.

A further object is to provide a rapid and convenient method for reducing the content of soluble oxides in relatively small batches of alkali metals.

An additional object is to provide a method of titrating a molten alkali metal to determine its content of dissolved metal oxides.

It is also an object to avoid the introduction of any significant excess of the reagent employed to reduce the oxides dissolved in an alkali metal melt.

Still another object is to utilize the same apparatus and method both for determining the dissolved oxide content of a batch of alkali metal and for removing those oxides.

SUMMARY OF THE INVENTION

It has now been discovered that oxides dissolved in alkali metal melts can be effectively removed by reducing them with reactive, soluble metals which form insoluble oxides and are added portionwise to the melt until there is detected an increase in the electrical resistance across an ion-conductive membrane interposed between the melt and an electrically conductive counter-material capable of accepting cations of the alkali metal from the membrane when that material is at a lower positive potential than the melt. This procedure constitutes a distinct improvement over known methods of reducing oxides dissolved in alkali metals, particularly when relatively small quantities of the alkali metals are to be treated.

More precisely, the process of the invention may be defined as the method of reducing the content of an alkali metal oxide, $M_2O$, dissolved in an alkali metal melt (as defined subsequently herein) which comprises:

(1) adding to and dissolving in said melt an alkaline earth or lanthanoid series metal, $M'$, thereby reducing said oxide and forming an oxide, $M'O$, which is essentially insoluble in said melt, according to the equation $$M_2O + M' \rightarrow M'O \downarrow + 2M,$$

said melt being in contact with a face of a membrane which is conductive to $M^+$ ions but is essentially nonconductive to cations of the metal $M'$ and has an opposed face in contact with an electrically conductive counter-material which, when negatively polarized with respect to said melt, will accept $M^+$ ions from the membrane, (2) imposing a potential difference, across the membrane, of such magnitude and polarity that $M^+$ ions pass through the membrane from the melt to the counter-material, and monitoring the electrical resistance to flow of cations from the melt to the counter-material, and (3) continuing to add said metal $M'$ to the melt until there is detected an abrupt, nontransient increase in said resistance.

In a preferred embodiment, the material employed on the other side of the membrane—the "counter material"—has the same composition as the body of melt to be titrated.

In another preferred embodiment, a conductive wire electrode-containing capillary is employed as the membrane. The capillary is filled with the counter material and suspended in the melt. (A second electrode extends into the melt and is connected to the first electrode through a circuit comprising a source of direct current and means for determining the resistance (in either direction) of the pathway between the electrodes, through the membrane.) This embodiment requires only a minimal amount of the melt and is thus suitable for analytical titrations of quite small samples.

A preferred form of the reductant metal is an alloy of the metal (such as barium) with an alkali metal (such as sodium). Controlled, gradual addition of the reductant is more readily achieved with such an alloy—particularly one in which the proportion of the reductant is low.

The direct current source preferably is adapted for polarity reversal, so that the resistance of the circuit in both directions can be compared to determine whether an observed resistance increase is due to an end-point having been reached or is an experimental artifact. At the end point, the resistance to ion flow through the membrane will be higher in either direction but much more so from the melt to the counter-material than in the reverse direction.

SUMMARY DESCRIPTION OF THE DRAWING

FIG. 1 depicts a simple but preferred apparatus for the practice of the present invention, in which a capillary tube formed of a glass conductive to $Na^+$ ions is employed as the membrane. The FIGURE is not drawn to scale.

DETAILED DESCRIPTION

Figure 1:
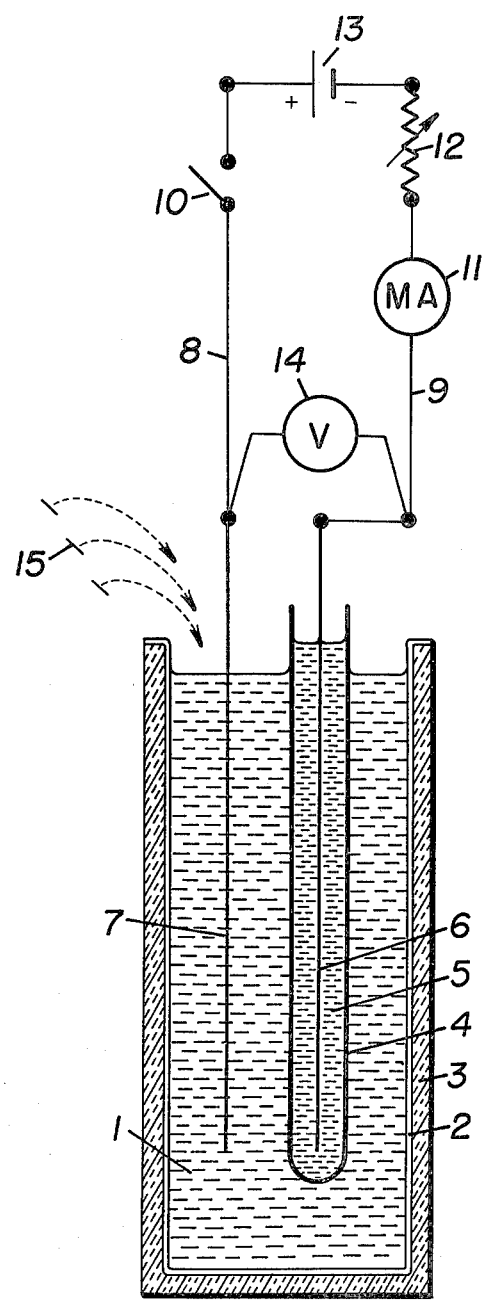

The apparatus essential to the practice of the invention includes a dry box, or equivalent means for providing an inert atmosphere around the rest of the apparatus. The other elements required are illustrated in FIG. 1. Given a batch (or sample) of an alkali metal and assuming that its content of reducible oxides is to be determined, as well as reduced, a known amount of the alkali metal is disposed as a melt (1) in a suitable container (2) preferably encased in a layer (3) of insulation. Optionally, a heating coil (not shown) may be wrapped around the container under (or substituted for) the insulation. A capillary tube (4) having walls conductive to cations of the alkali metal and containing a molten counter material (5), which may simply be more of the alkali metal, is suspended, as shown, in the melt (1). Electrodes (6 and 7) are connected through leads (8 and 9), a switch (10), a milliammeter (11), and a variable resistor (12) to a dry cell (13), in such manner that, when switch (10) is closed, the direction of electron flow in the circuit, as shown, will be clockwise. The voltage drop between electrodes (6 and 7) is measured by an electronic voltmeter (14) and the ratio of this voltage to the current indicated by the ammeter (11) is the resistance of the electrical path from electrode (6) through the counter material (5), the membrane (capillary wall) and the melt (1) to electrode (7). The resistances of the other elements in the latter path are small, in comparison to the resistance of the membrane itself, and presumably constant. Thus, the resistance of the latter electrical path to electron flow is taken as equal to the resistance to flow of cations from the melt, through the membrane, to the counter material. (The resistance of the path in the reverse direction can be checked by opening switch 10, reversing the position of cell (13) and reclosing the switch.)

To carry out the reduction (titration), small pieces (15) of the reductant metal (or alloy thereof) are added at intervals to the melt (1). Convective mixing ordinarily will suffice, but a stirring means (not shown), suitable for use with molten alkali metals, may be employed to minimize the time required for the titration. If the reading on the voltmeter increases and the increase does not then subside, the connections to the dry cell may be reversed and the voltmeter again read. If the two readings are the same, the resistance increase is considered as an artifact which does not indicate that the end-point in the titration has been reached. However, if an endpoint has been attained, the resistance to clockwise (forward) electron flow (in the circuit of FIG. 1) will be much higher than the resistance to counter-clockwise (reverse) electron flow.

The accuracy of the titration (the extent to which the amount of reductant metal added is in excess of the minimum amount required to reduce the oxide(s)) may be checked by back-titration. That is, an oxygen source gas, such as dry air, may be slowly metered in, under the surface of the melt and through a restricted opening, until the forward resistance is only slightly greater than the reverse resistance.

The foregoing reversals of the battery connections of course can be facilitated by replacing switch (10) with an appropriately connected double-pole, double-throw switch.

Suitable alkali metal melts for the practice of the present invention are electrically conductive solutions of alkali metal oxides in homogeneous, liquid metal compositions otherwise consisting essentially of one or more alkali metals and, optionally, one or more metals having higher ionization potentials than the reductant metal to be employed in the titration.

The melt may contain any amount, up to the saturation level at the titration temperature, of each of one or more alkali metal oxides. As the reduction of the dissolved oxide(s) proceeds, undissolved oxides present (dispersed in the melt as a second phase) may dissolve and also be reduced. However, this will be necessary only if the undissolved oxide particles are of a physical nature such as not to be removable by filtration.

In most cases, the melt will consist simply of a single alkali metal containing (up to several hundred parts per million of) the simple oxide ($M_2O$) of that metal and such melts are preferred for the practice of the invention. However, alloys of alkali metals with each other and/or non-alkali metals other than alkaline earth or lanthanoid series metals may also be essentially freed of dissolved alkali metal oxides by the present method, provided that their melting temperatures are not so high as to render the process impracticable. Specific known types of such alloys are alkali-metal amalgams, sodium lead alloys and lithium gallium alloys.

Suitable membranes for the practice of the present invention are otherwise suitable membranes which are conductive to cations of the alkali metal components of the melt to be titrated and are essentially non-conductive to an alkaline earth of lanthanoid series metal which is soluble in the melt. Otherwise suitable membranes are those which are not detrimentally effected to an intolerable extent by contact with the melt or counter material at the temperatures under which the titration is to be carried out. That is, the membrane material must be essentially inert to the materials on each side of it and of such a nature that the structure and electrical properties of the membrane essential to its role in the titration are largely retained at the temperature to be employed.

Exemplary of suitable types of membranes are the various cation-conductive ceramics and glasses disclosed in U.S. Pat. Nos. 3,413,150; 3,672,995; 3,829,331; 3,877,995; 3,953,228; 4,049,885; 4,050,915 and 4,055,710. Preferred membranes for the practice of the present invention are hollow fibers or capillaries consisting of the borate glasses such as those disclosed in U.S. Pat. No. 3,829,331.

Suitable counter-materials are any otherwise suitable materials which are electrically conductive and capable of accepting alkali-metal cations from the membrane, when disposed in contact with the opposite side thereof from the melt to be titrated and subjected to a transmembrane potential difference of appropriate polarity and magnitude.

Of course, when the counter-material is differently constituted than the melt, the voltage reading across the membrane must be corrected by the open circuit potential difference of the resulting cell couple.

Preferably, the counter-material is so composed as to be a source of $M^+$ ions but not of cations capable of blocking the membrane surface it is in contact with, when a reverse potential is applied. Otherwise, the possibility that a forward resistance increase is merely an artifact cannot be eliminated simply by checking the reverse resistance. As a general rule, such artifacts will not occur, particularly in repeated, routine titrations of samples that differ only in oxide content. However, it is highly preferable to be able to ensure that artifacts are not mistaken for endpoints.

When more of the melt to be titrated is employed as the counter-material, the advantage of eliminating sources of variations other than those intended to occur in the course of the titration is realized and no voltage correction is necessary. In general, though, the counter-material need not be the same as or even closely resemble the melt. The counter-material will generally be a liquid but does not necessarily have to be a molten metal. So long as appropriate safety precautions are observed, the counter-material and the melt may be widely divergent in type. Solutions of alkali metal salts in polar organic or inorganic solvents, such as those which have been disclosed for use in relatively low-temperature alkali metal/chalcogen battery cells, may be used as counter materials: see U.S. Pat. Nos. 3,877,988; 3,907,597; 3,953,235; 3,966,069; 3,966,490 and 3,998,658, for example.

Another type of material suitable for use as a counter material in the present method comprises a molten salt. For example, sulfur/alkali metal sulfide melts are commonly employed as the catholyte in alkali metal/sulfur battery cells. Another type of molten salt electrolyte used in alkali metal battery cells is alkali metal chloraluminates: see U.S. Pat. No. 3,847,667.

Suitable reductant metals for the practice of the invention are those which (a) are capable of reducing the alkali metal oxide of interest to the free alkali metal; (b) are oxidized in the reaction to form oxides which are insoluble in the alkali metal melt, and (c) have a low enough ionization potential to be a source of cations when dissolved in the melt and subjected to practicable, positive D.C. potential differences, vis-a-vis the counter-material. The metals presently known to meet the foregoing specifications are the alkaline earth metals and the lanthanoid series metals. The alkaline earth metals, and barium in particular, are preferred as the reductant metal.

The reductant metal preferably is employed in the form of an alloy with an alkali metal, the proportion of the reductant metal therein being low and the alkali metal being the same as one present in the melt to be titrated. Conveniently, the latter alloy is extruded as a fine wire which can be cut into small segments readily. By adding the segments one at a time and allowing time (thirty seconds, say) for equilibration after each addition, overshooting of the end-point to any substantial degree is avoided. Of course, in such applications as analysis of alkali metal samples for which the oxide content is approximately known, most of the reductant metal can be added more rapidly in the initial stage of the titration.

Reaction conditions, such as temperature, pressure and intensity of mixing (if any) will generally not be critical in carrying out the reduction. The temperature of course will be at least as high as the melting point of the alkali metal or alloy containing the oxide(s) to be converted, but will not exceed the initial boiling point of the melt. In order to avoid an extra, and possibly difficult, filtration step for removal of oxide particles which are not dissolved at a given temperature, the temperature of the melt (and of the membrane and counter-material) may be increased until all of the oxides present are dissolved and a correspondingly greater amount of the reductant metal employed.

Although the atmosphere (of dry, inert gas) around the apparatus may be at any convenient pressure, ordinary practice will be to carry out the reduction in an enclosure, such as a glove box, wherein the pressure is kept slightly higher than the outside pressure.

EXAMPLES

The following example is for purposes of illustration and is not to be construed as limiting the scope of the invention in a manner inconsistent with the claims appended to these specifications.

EXAMPLE 1

The following experiment was run in a dry box. About 50 milliliters of molten, calcium-free sodium, having a small but not precisely known content of sodium oxide, was placed in a series 1100 aluminum tube, about 15 cm long and having a diameter of about 3 cm, and heated to a temperature of about 390° C. A capillary tube having an outer diameter of about 1 mm and a wall thickness of about 100 microns was filled with more of the calcium-free sodium (the counter-material) and immersed, in vertical alignment and to a depth of several cm, in the main body of the sodium (the "melt"). The ends of two aluminum lead wires were inserted in the sodium within and without the capillary (the "membrane") and connected, essentially as shown in FIG. 1, to a 1.5 volt dry cell in series with a polarity-reversing switch and a resistance of about 1000 ohms. The capillary glass composition was $Na_2O.2B_2O_3.0.16NaCl.0.2S_iO_2$.

The forward and reverse voltage drops measured with an electronic voltmeter connected as in FIG. 1 were found to be the same and, at a current of about 1.3 milliamps (measured with a milliammeter), corresponded to a resistance of about 30 ohms for the path between the voltmeter connections through the melt, the capillary wall and the counter-material.

A piece of 5 mm diameter, barium/sodium alloy wire having a barium content of about 60,000 ppm (parts per million) and about 0.9 cm long was added to the melt and forward and reverse voltage drop and current readings taken at intervals thereafter. In less than a minute, the resistance in the reverse direction had increased to about 50–80 ohms but the forward resistance had increased to many hundreds of ohms.

About 5 ml of room air (about 1 ml of $O_2$) was then injected about 1 cm below the melt surface with a syringe. In less than 0.5 minute, the forward and reverse voltage drops were equal and corresponded again to a resistance of 30 ohms.

On addition of about 0.5 cm more of the barium/sodium wire, the ratio of forward to reverse resistance again rose dramatically. Incremental injection of a total of 4 ml of room air again restored the voltage (and current) readings to about their original values.

At this point a barium/sodium wire having a diameter of about 3.2 mm and a nominal barium content of only about 1500 ppm was switched to as the reductant metal source material. Pieces of this wire, about 4 cm long each, were added at intervals until a total of 8 pieces had been added and a sudden rise in the ratio of forward to reverse voltages, again indicating an end-point, was observed.

It is evident from the foregoing results that a quantitative determination of alkali metal oxide content can be carried out by carefully determining the amounts of melt and reductant metal employed. It is also apparent that a high degree of accuracy can be attained by adding a (small) excess of the reductant metal and then back-titrating with a carefully metered stream of a gas having a low, accurately known oxygen content, until the forward resistance exceeds the reverse resistance, by several percent or less.

The preferred membrane configuration is that of a capillary tube, such as was employed in the foregoing example. However, the membrane may also take other forms, such as a flat sheet or one or more hollow fibers closed at one end. Since it is not very practical to insert electrode wires in hollow fibers, it will generally be expedient to utilize a counter-material reservoir, several millimeters or more in diameter, having an electrically non-conducting bottom from which the fibers depend and through which their open ends pass in sealing engagement, when hollow fibers are used as the membrane.

What is claimed is:

1. The method of reducing the content of an alkali metal oxide, $M_2O$, dissolved in an alkali metal melt, comprising
   (1) adding to and dissolving in said melt an alkaline earth or lanthanoid series metal, M', thereby reducing said oxide and forming an oxide, M'O, which is essentially insoluble in said melt, according to the equation $$M_2O + M' \rightarrow M'O \downarrow + 2M,$$ 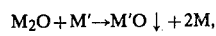

(2) disposing said melt in contact with a first face of a membrane which
      (a) is conductive to $M^+$ ions but is essentially non-conductive to cations of the metal M', and
      (b) has an opposed face in contact with an electrically conductive counter-material which, when negatively polarized with respect to said melt, will accept $M^+$ ions from the membrane,
   (3) imposing a potential difference, across the membrane, of such magnitude and polarity that $M^+$ ions pass through the membrane from the melt to the counter-material,
   (4) monitoring the resistance to flow of cations from the melt to the counter-material through said membrane, and
   (5) continuing to add said metal M' to the melt until an abrupt, non-transient increase in said resistance occurs.

2. The method of claim 1 in which said melt consists essentially of an alkali metal M and the oxide, $M_2O$, thereof.

3. The method of claim 2 in which M is sodium (Na).

4. The method of claim 1 in which said counter-material has essentially the same composition as the melt.

5. The method of claim 1 in which said membrane is in the form of a capillary tube closed at one end.

6. The method of claim 1 in which the reductant metal is an alkaline earth metal.

7. The method of claim 6 in which the reductant metal is barium.

8. The method of claim 1 in which the reductant material is in the form of an alloy with an alkali metal which is the same as one present in the melt.

9. The method of claim 8 in which the reductant metal is in the form of an alloy of barium with sodium.

10. The method of claim 1 in which:
   (a) said counter-material will give up $M^+$ ions to the membrane if a potential difference of reverse polarity is applied across the membrane,
   (b) such a reverse potential is so applied, and (c) the resistance to flow of cations from the countermaterial to the melt is determined.

11. The method of claim 10 in which an excess of the reductant metal, over that required to produce said resistance increase, is added to the melt, and an oxygen-containing gas is metered into the melt until said resistance has decreased to a value which exceeds the resistance to flow of cations in the reverse direction, by only a few percent or less.

* * * * *

UNITED STATES PATENT AND TRADEMARK OFFICE
CERTIFICATE OF CORRECTION

PATENT NO. : 4,225,395
DATED : September 30, 1980
INVENTOR(S) : Floris Y. Tsang

It is certified that error appears in the above–identified patent and that said Letters Patent are hereby corrected as shown below:

Column 8, line 60, "material" should be -- metal -- .

Signed and Sealed this

Third Day of March 1981

[SEAL]

Attest:

RENE D. TEGTMEYER

Attesting Officer        Acting Commissioner of Patents and Trademarks